Aug. 7, 1945.   R. S. PYNE ET AL   2,381,687
DRIVE FOR OSCILLATING GRINDERS
Filed Nov. 14, 1941   3 Sheets-Sheet 2
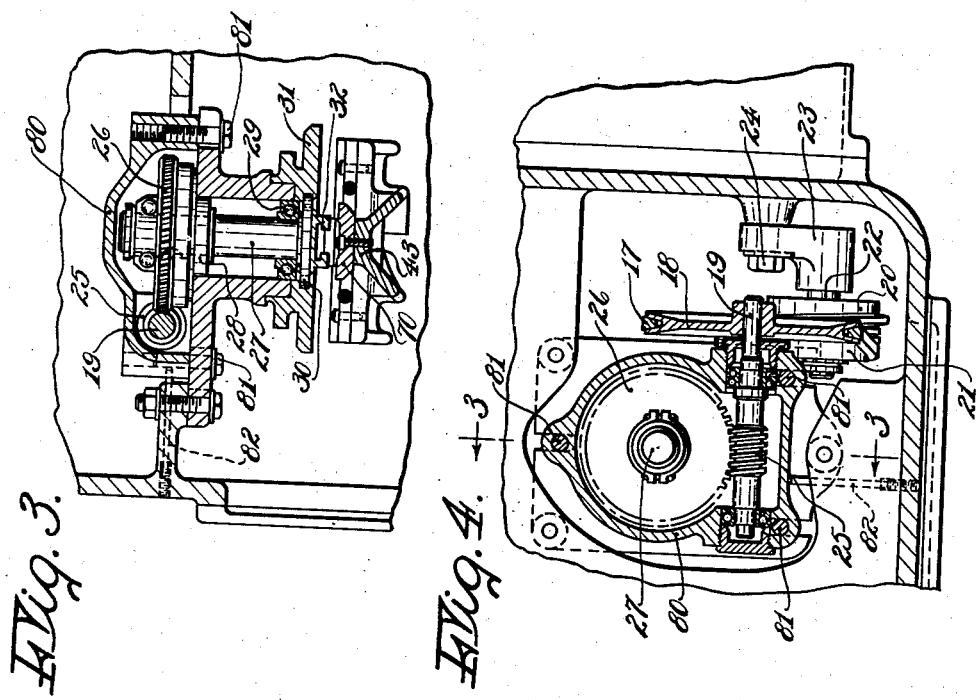
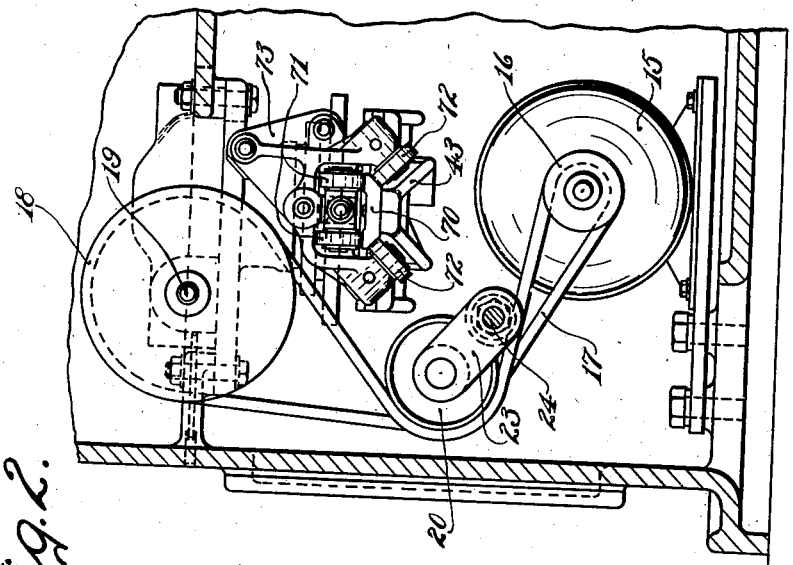
INVENTORS
ROGER S. PYNE AND
EDWARD A. ALLEN
BY Chapin & Neal
ATTORNEYS

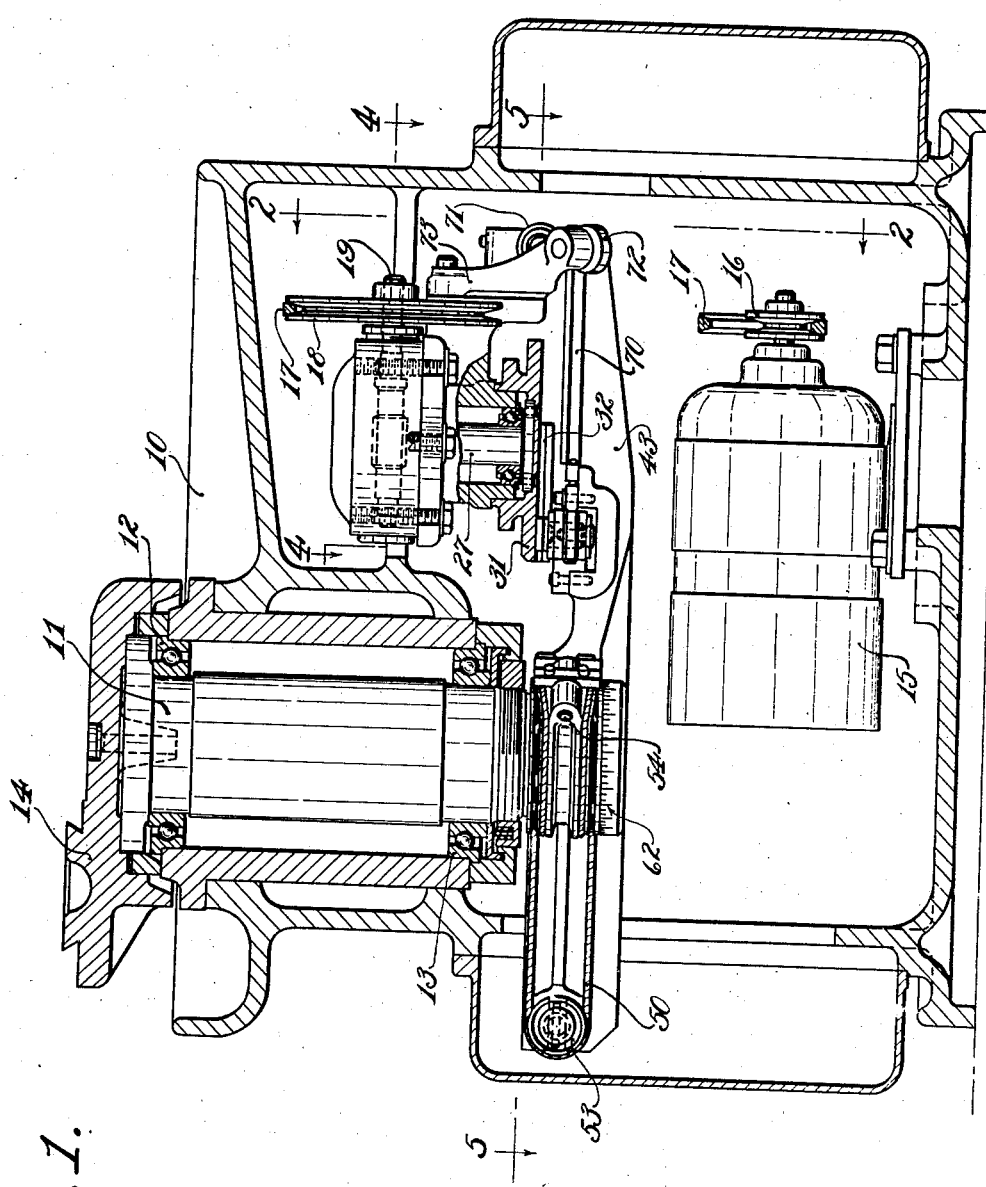

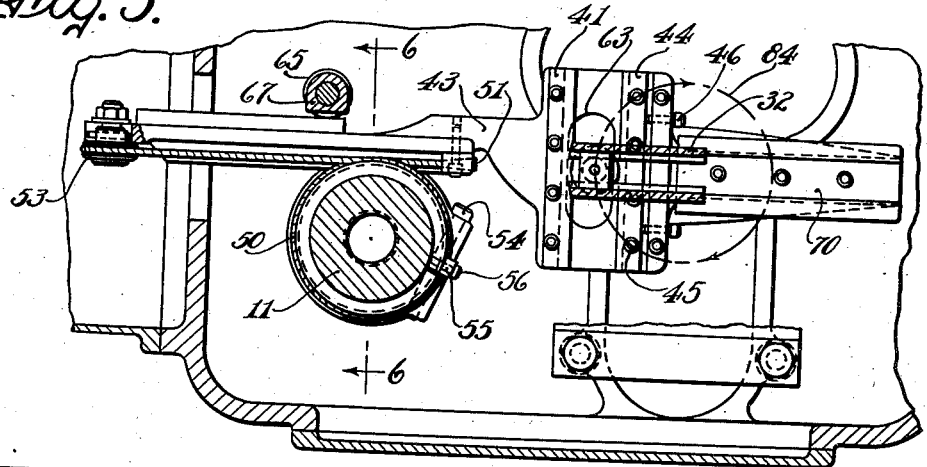
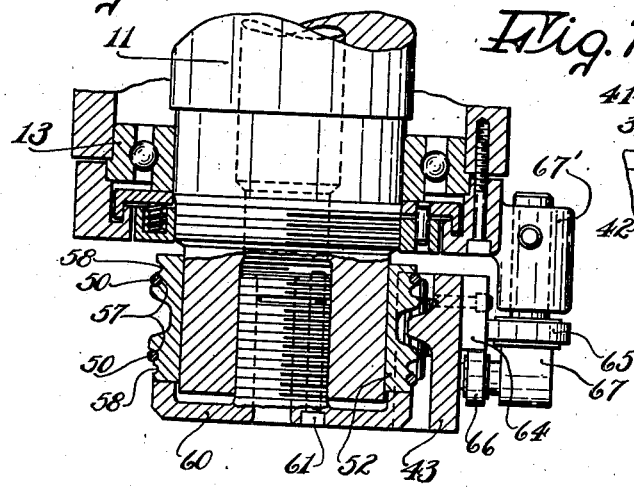
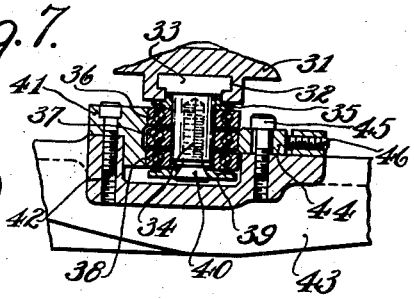
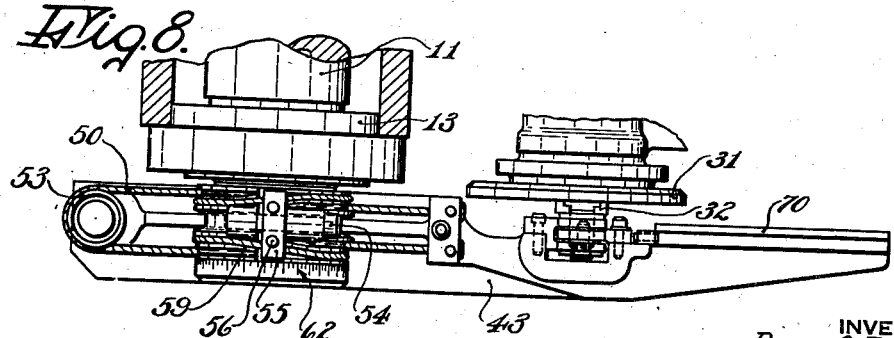

Patented Aug. 7, 1945

2,381,687

UNITED STATES PATENT OFFICE 2,381,687

DRIVE FOR OSCILLATING GRINDERS

Roger S. Pyne, Springfield, and Edward A. Allen, Westfield, Mass., assignors to Van Norman Company, a corporation of Massachusetts Application November 14, 1941, Serial No. 419,094

2 Claims. (Cl. 74—82)

This invention relates to oscillating grinders, and has for its object the production of an improved driving mechanism for the oscillatory head. In particular it has for its object the provision of a driving mechanism by which the head may be caused to oscillate with substantially harmonic motion and through an arc greater than is possible with ordinary crank motions. A further object is to provide an extremely wide range of adjustment to the angular throw of the head.

Additional objects will appear from the following description and claims.

The invention will now be described in connection with the accompanying drawings in which:

Fig. 1 is a side elevation of the oscillating post of an oscillating grinder together with its operating mechanism with certain of the parts broken away in substantially median section;

Fig. 2 is a fragmentary section on line 2—2 of Fig. 1;

Fig. 3 is a section on line 3—3 of Fig. 4;

Fig. 4 is a sectional plan taken on line 4—4 of Fig. 1;

Fig. 5 is a sectional plan taken on line 5—5 of Fig. 1;

Fig. 6 is a section on line 6—6 of Fig. 5;

Fig. 7 is a section of the connection between the adjustable crank pin and the slide; and Fig. 8 is a fragmentary detail like Fig. 1 but with the parts in a different part of the cycle.

On the usual frame 10 an oscillatory post 11 is mounted as on ball bearings 12 and 13. At its upper end the post carries a support 14 upon which the work head may be mounted so as to oscillate about the axis of the post as is well understood in the art. The present invention not being concerned with the details of the work head and grinding wheel carrier, these parts have not been shown; but their general construction will be evident to those skilled in the art and may be seen for example in the Van Norman Patent 2,149,409, March 7, 1939.

Within the base of the machine is mounted a motor 15 which is preferably used exclusively for causing oscillation of the post 11. This motor carries a pulley 16 connected by a belt 17 with a pulley 18 on a drive shaft 19, best shown in Fig. 4. Between the pulleys 16 and 18 the belt passes over a pair of pulleys 20 and 21 which are free on a stud 22 carried by an adjustable member 23 secured to the frame at 24. These latter pulleys act as belt tighteners and keep the belts from interference with certain other parts to be described.

Upon the drive shaft 19 is a worm 25, meshing with a worm wheel 26 on a vertical crank shaft 27. The casing 80 carrying the worm wheel 26 is held in place by screws 81, and may be adjusted for proper mesh with the wheel by a screw 82. The crank shaft 27 is journaled (Fig. 3) in ball bearings 28 and 29 and has a flange 30 at its bottom to which a disk 31 is secured. In this disk (see Fig. 7) are formed ways 32 in which slides the head 33 of an adjustable crank pin 34. A washer 35 bears against the bottom of the ways 32, and strung on the crank pin are ball bearings 36, 37, and 38 below which is a washer 39. The whole assembly is clamped tightly together by a stud 40 so that the head of the crank pin is clamped firmly in the slot. The ball bearings 36 and 38 roll against guides formed on a member 41 secured as by studs 42 to a connecting rod 43 to be considered in detail below. The central bearing 37 runs against a member 44 held on the connecting rod 43 by studs 45 and adjustable by screws 46. The members 41 and 44 form a guideway (see Fig. 5) or sliding connection on the connecting rod 43 in which the crank pin 34 reciprocates as the head 33 rotates (path 84) about the axis of shaft 27. The slot 63 shown in Fig. 5 is to permit access to the stud 40 for adjustment of the pin 34 in ways 32.

As the connecting rod 43 is forced back and forth by the rotation of the crank pin it oscillates the post 11 by means of a wire cable 50 anchored at its ends to the connecting rod at 51 looped around a drum 52 (Fig. 6) secured to the post and passing around a cable tightening pulley 53 on the end of rod 43. The drum is split and is held in clamped position as by a bolt 54, and a cable clamp 55 is secured to the drum as by studs 56. This clamp is located as shown in Fig. 8 directly opposite the connecting rod 43 when the latter is in midposition so that it never strikes the connecting rod when the latter is oscillated to one extreme position or the other. It should be noted that the cable 50 (at the left in Fig. 6) coming from the end clamps 51 passes around a semi-circumference of the drum in intermediate grooves 57, and that it passes from the drum to the pulley 53 from upper and lower extreme grooves 58, passing from one to the other set of grooves by slanting portions 59 of the latter, as shown in Fig. 8. This avoids any interference between the portion of the cable on the drum and that held by the connecting rod.

The driving mechanism described lends itself to accurate and ready change of the angle of oscillation of the post 11, and for this purpose a cap 60 (Fig. 6) threaded into the drum 52 is secured to the bottom of the post as by a stud 61 and bears graduations 62 against which the edge of the clamp 55 or any other suitable index on the drum may be brought into registry when the bolt 54 is unloosened. On tightening the bolt the post will be held in the described relationship with the connecting rod.

In order to attain accuracy in operation and to prevent any tendency to slackness in the cable, it is necessary to support the connecting rod so that the cable does not have to bear its weight, and so that it will be directed in a straight line by the action of the crank pin. For this purpose the connecting rod 43 (Fig. 6) is provided with a bearing strip 64 against which bear rollers 65 and 66 carried by a support 67 firmly held in a bearing 67' extending from the frame. At the other end the connecting rod is provided with a portion 70 of trapezoidal section (Fig. 2) against the top of which bear guiding rollers 71, and across the sides of which bear rollers 72. These rollers are connected in a suitable bracket 73 mounted on the machine frame. The crank pin should be revolved in the direction of the arrow 84 (Fig. 5), so that the connecting rod will be swung against the guide roll 65 and not pressed against the cables.

Due to this method of guiding, the connecting rod 43 will be carried back and forth in a straight line without deviating up or down with respect to the cable. Thus, by changing the position of the crank pin in the ways 32 the stroke given to the connecting rod and therefore the angle of oscillation of the post 11 can be changed as desired. It will be apparent that in contrast with the usual crank method of oscillating the post, shown in the Van Norman patent referred to and in common use, the one described is capable of a much greater amplitude of motion. In operating by a connecting rod coupled to a rotating crank at one end and an oscillating crank at the other too great an amplitude of oscillation cannot be given due to the fact that the oscillating crank becomes unsteady as the crank approaches the same line as the connecting rod. With the proper construction as we have herein disclosed no such limit occurs, and the angle of oscillation may be made as large as desired, limited only by the radius of the crank and the length of the connecting rod between the two ends of the cable and the pulley 53. Furthermore, the unevenness of the motion on the two sides of the mid position of the oscillating post which occurred under the prior construction are by the present invention completely avoided since the action of the connecting rod is perfectly symmetrical about its mid point.

What we claim is:

1. In an oscillating grinder, a work-carrying post, a drum rotatably adjustable on the post and having top and bottom grooves and a pair of intermediate grooves, a constantly driven shaft, a crank carried on the shaft, a slide member guided for straight line motion tangent to the drum and having ways transverse to its path to receive the crank, and a substantially non-extensible flexible member attached at its ends to the slide member at one side of the drum, passing in parallel strands around the drum and attached at the other side of the drum to the slide member, said second attachment comprising a pulley around which the flexible member passes, said flexible member passing onto the drum in said upper and lower grooves and leaving it in said intermediate grooves, and a clamp holding the flexible member to the drum.

2. In an oscillating grinder, a work-carrying post, a constantly driven shaft, a crank pin carried eccentrically by the shaft, a slide guided for rectilinear reciprocation in a path tangent to the post, opposed parallel ways carried by the slide and extending at right angles to its path of reciprocation, three rollers mounted for rotation on the crank pin, the intermediate roller contacting one of said ways only and the other rollers contacting the other of said ways only, means for adjusting one of said ways towards the other to eliminate all lost motion between the crank pin and the slide, and a substantially non-extensible member wound around said post and connected to the slide member on opposite sides of the post.

ROGER S. PYNE.
EDWARD A. ALLEN.